United States Patent
Li et al.

(10) Patent No.: US 8,200,054 B1
(45) Date of Patent: Jun. 12, 2012

(54) HIGH EFFICIENCY GRATING COUPLING FOR LIGHT DELIVERY IN EAMR

(75) Inventors: Ruolin Li, Milpitas, CA (US); Yufeng Hu, Fremont, CA (US); Ut Tran, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 444 days.

(21) Appl. No.: 12/426,262

(22) Filed: Apr. 19, 2009

(51) Int. Cl.
*G02B 6/34* (2006.01)
*G11B 11/00* (2006.01)
*G11B 11/24* (2006.01)

(52) U.S. Cl. ............... 385/37; 369/13.3; 369/13.33
(58) Field of Classification Search ........... 369/13.29, 369/13.3, 13.33
See application file for complete search history.

(56) References Cited

U.S. PATENT DOCUMENTS

| | | | |
|---|---|---|---|
| 4,743,083 A | 5/1988 | Schimpe | |
| 5,031,993 A | 7/1991 | Asthana et al. | |
| 5,204,516 A | 4/1993 | Opheij | |
| 5,258,871 A * | 11/1993 | Gupta | 359/489.06 |
| 5,631,885 A * | 5/1997 | Brazas, Jr. | 369/44.23 |
| 5,663,592 A | 9/1997 | Miyazawa et al. | |
| 6,519,379 B1 | 2/2003 | Izawa et al. | |
| 7,046,892 B2 | 5/2006 | Yoshikawa et al. | |
| 7,151,738 B2 | 12/2006 | Peng | |
| 7,412,143 B2 | 8/2008 | Rottmayer et al. | |
| 7,792,402 B2 * | 9/2010 | Peng | 385/37 |
| 8,000,175 B2 * | 8/2011 | Shimazawa et al. | 369/13.13 |
| 2001/0038577 A1 * | 11/2001 | Chang et al. | 369/13 |
| 2002/0176463 A1 | 11/2002 | Bullington et al. | |
| 2005/0122850 A1 | 6/2005 | Challener et al. | |
| 2005/0289576 A1 | 12/2005 | Challener | |
| 2006/0005216 A1 | 1/2006 | Rausch | |
| 2007/0165495 A1 | 7/2007 | Lee et al. | |

FOREIGN PATENT DOCUMENTS

WO 2005045815 A1 5/2005

* cited by examiner

*Primary Examiner* — Omar Rojas (57) ABSTRACT

A magnetic head comprising a waveguide coupler for coupling incident electromagnetic (EM) radiation into a waveguide is disclosed. The waveguide coupler includes a bottom clad layer and a waveguide core layer formed above the bottom clad layer. An interface between the bottom clad layer and the waveguide core layer includes a first grating having a first period and a first etch depth, which are configured to couple a first portion of the incident EM radiation into the waveguide core layer. The waveguide coupler can further comprise a top clad layer formed above the waveguide core layer. An interface between the waveguide core layer and the top clad layer includes a second grating having a second period and a second etch depth. The second period and the second etch depth are configured to couple a second portion of the incident EM radiation into the waveguide core layer.

24 Claims, 6 Drawing Sheets

HIGH EFFICIENCY GRATING COUPLING FOR LIGHT DELIVERY IN EAMR

FIELD OF THE INVENTION

The present invention generally relates to magnetic recording heads and, in particular, relates to high efficiency grating coupling for light delivery in an energy-assisted magnetic recording (EAMR) head.

BACKGROUND OF THE INVENTION

To increase the areal storage density of a magnetic recording device, the recording layer thereof may be provided with smaller and smaller individual magnetic grains. This reduction in grain size soon reaches a "superparamagnetic limit," at which point the magnetic grains become thermally unstable and incapable of maintaining their magnetization. The thermal stability of the magnetic grains can be increased by increasing the magnetic anisotropy thereof (e.g., by utilizing materials with higher anisotropic constants). Increasing the magnetic anisotropy of the magnetic grains, however, increases their coercivity and therefore requires a stronger magnetic field to change the magnetic orientation of the grains (e.g., in a write operation).

Energy-assisted magnetic recording (EAMR) is used to address this challenge. In an EAMR system, a small spot where data is to be written is locally heated to reduce the coercivity of the magnetic grains therein for the duration of the write operation, thereby allowing materials with increased magnetic anisotropy to be used, and greater areal storage density to be exploited. In EAMR approach, a semiconductor laser diode is normally used as a light source and coupled to a planar waveguide which serves as light delivery path. A grating structure may be used to couple the laser light into the waveguide. Design challenges for these grating structures include improving their coupling efficiency and the difficulty in aligning a light source for high volume manufacturing processes. The coupled light is then routed to a near field transducer by which the optical energy is provided to a small spot on the recording media a few tens of nanometers (nm) in size.

The overall light coupling efficiency is important in this approach for a number of reasons. First, it ensures that sufficient energy is delivered to the media so that a sufficient thermal change is achieved for the recording operation. Second, it allows for a lower power (i.e., less expensive) light source to be used. Finally, with improved efficiency, the total power consumption of the EAMR can be reduced, reducing reliability issues associated with high operating temperatures. Unfortunately, many EAMR heads have such poor coupling efficiency that they require costly high-power light sources and suffer from many heat-related reliability issues.

SUMMARY OF THE INVENTION

Various embodiments of the present invention solve the foregoing problems by providing a dual-grating waveguide coupler having a top grating and a bottom grating, wherein the top grating has a first period and a first etch depth, and the bottom grating has a second period and a second etch depth. The grating periods and etch depths are selected so as to maximize the coupling of different portions of incident electromagnetic (EM) radiation into the waveguide core layer. Such a dual-grating waveguide structure can provide an improved coupling efficiency and reduce the laser alignment problem by capturing a higher percentage of the incident EM radiation.

According to one embodiment of the subject disclosure, a magnetic head comprising a waveguide coupler for coupling incident electromagnetic (EM) radiation into a waveguide is provided. The waveguide coupler can comprise a bottom clad layer. The waveguide coupler can further comprise a waveguide core layer formed above the bottom clad layer. An interface between the bottom clad layer and the waveguide core layer can comprises a first grating having a first period and a first etch depth. The first period and the first etch depth can be configured to couple a first portion of the incident EM radiation into the waveguide core layer. The waveguide coupler can further comprise a top clad layer formed above the waveguide core layer. An interface between the waveguide core layer and the top clad layer can comprises a second grating having a second period and a second etch depth. The second period and the second etch depth can be configured to couple a second portion of the incident EM radiation into the waveguide core layer.

According to another embodiment of the subject disclosure, a method of making a magnetic head comprising a waveguide coupler for coupling incident electromagnetic (EM) radiation is provided. The method can comprise providing a substrate. The method can further comprise depositing a bottom clad layer over the substrate. The method can further comprise forming a first grating structure in the bottom clad layer. The first grating structure can comprise a first period and a first etch depth. The first period and the first etch depth can be configured to couple a first portion of the incident EM radiation into a waveguide core layer. The method can further comprise depositing the waveguide core layer over the bottom clad layer. The method can further comprise forming a second grating structure in the waveguide core layer. The second grating structure can comprise a second period and a second etch depth. The second period and the second etch depth can be configured to couple a second portion of the incident EM radiation into the waveguide core layer. The method can further comprise and depositing a top clad layer above the waveguide core layer.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention. The word "exemplary" is used herein to mean "serving as an example, instance, or illustration." Any embodiment or design described herein as "exemplary" is not necessarily to be construed as preferred or advantageous over other embodiments or designs.

Figure 1:
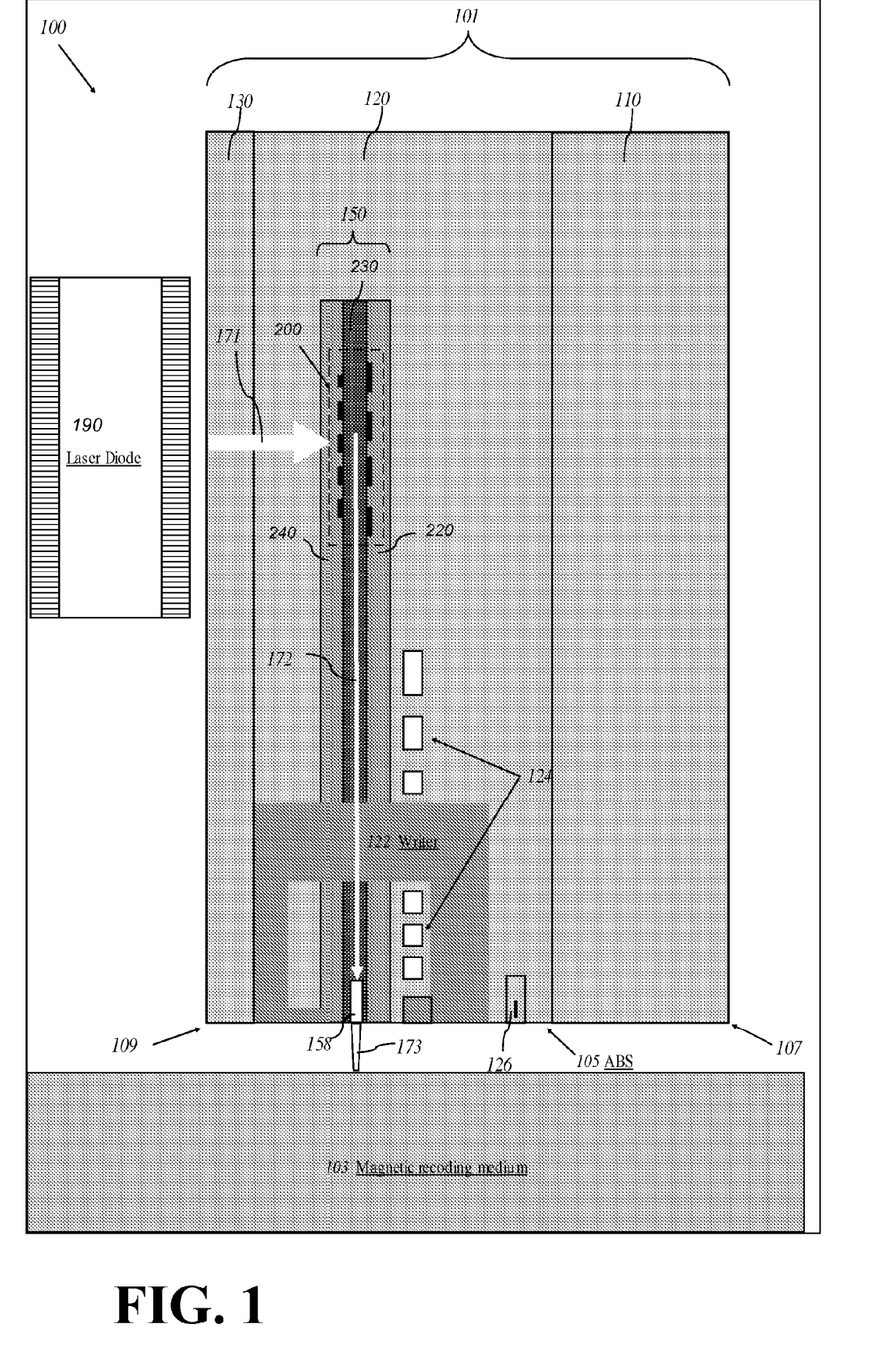
FIG. 1 is a cross-sectional diagram illustrating an exemplary EAMR head comprising a dual-grating waveguide coupler according to one aspect of the subject technology.

FIG. 1 is a cross-sectional diagram illustrating an exemplary EAMR head 100 comprising a dual-grating waveguide coupler 200 according to one aspect of the subject technology. The EAMR head 100 comprises a slider 101. The slider 101 comprises a substrate 110, a recorder/reader layer 120 disposed over the substrate 110, and an overcoat layer 130 disposed over the recorder/reader layer 120. In certain embodiments, the substrate 110 comprises AlTiC and the overcoat layer 130 comprises alumina. The slider 101 has a leading edge 107 and a trailing edge 109, and an air-bearing surface (ABS) 105 facing a magnetic recording medium 103. The recorder/reader layer 120 of the slider 101 includes a writer 122 for recording or erasing information on the medium 103 by focusing a magnetic field on a spot on the medium 103, a coil 124 for generating the magnetic field, a reader 126 for reading a magnetic bit recorded on the medium 103, and a waveguide structure 150. The waveguide structure 150 includes a first, top clad layer 240 and a second, bottom clad layer 220 surrounding the waveguide core layer 230. The waveguide structure 150 further includes a dual-grating waveguide coupler portion 200 that is configured to couple incident EM radiation (e.g., laser beam 171 from a laser diode 190) into a waveguide core layer 230 disposed in the coupler 150. The waveguide structure 150 further includes a near field transducer (NFT) 158 formed at a distal end of the waveguide structure 150 proximate the ABS 109. The NFT 158 is configured to concentrate energy from the laser beam to a nano-sized spot on the recording medium 103 well below the diffraction limit from which standard focusing lenses suffer. The NFT 158 may be formed of a metal such as gold (Au), silver (Ag), aluminum (Al), copper (Cu), or a combination (alloy) thereof.

During the operation of a hard disk drive comprising the EAMR head 100, the magnetic recording medium 103 rotates at high speed, and air flowing at high speed between the ABS 105 and the magnetic recording medium 103 provides an upward force to the slider 101 such that the slider 101 is maintained at a certain height from the magnetic recording medium 103. A portion of the incident laser beam 171 emitted by the laser diode 190 and arrived at the waveguide structure 150 is coupled into the waveguide core layer 154 by the dual-grating waveguide coupler 200 to form a coupled laser beam 172 traveling down the waveguide core layer 154 toward the ABS 105. The energy from coupled laser beam 172 is concentrated onto a nano-sized spot on recording medium 103 by means of the NFT 158. The nano-sized heated spot on the magnetic medium 103 is subsequently subjected to a pulse of write magnetic field from the writer 122.

Figure 2A:
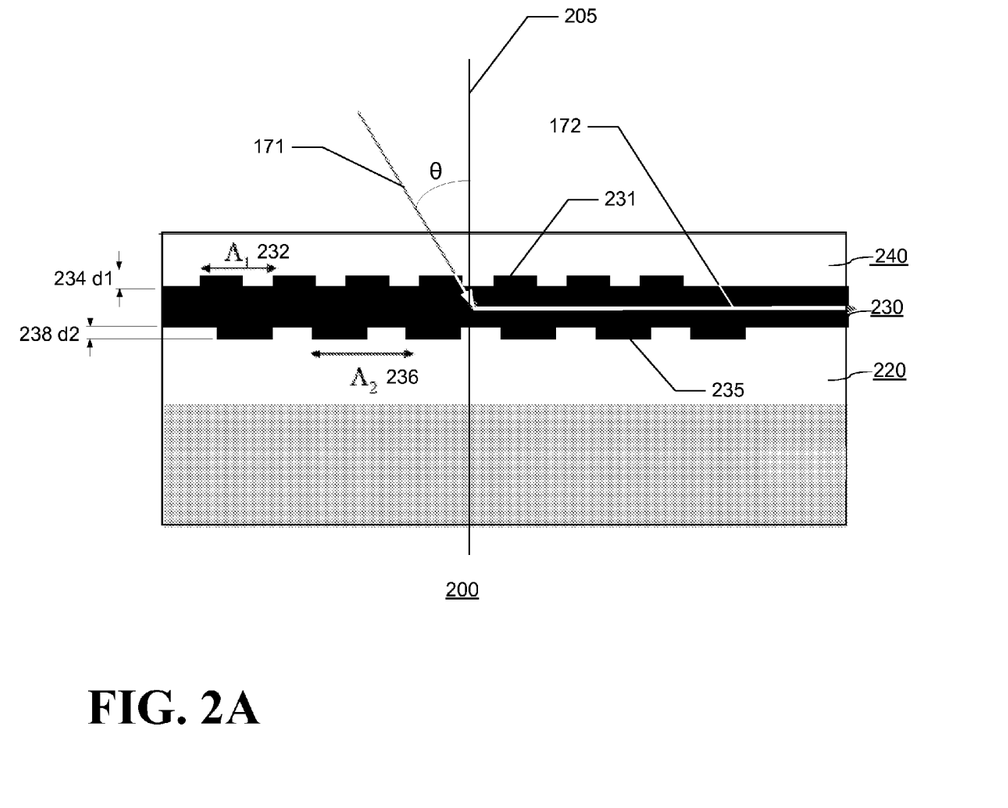
FIG. 2A is a diagram illustrating an exemplary dual-grating waveguide coupler according to one aspect of the subject technology.

FIG. 2A is a diagram illustrating an exemplary dual-grating waveguide coupler such as coupler 200 shown in FIG. 1, according to one aspect of the subject technology. In the illustrated example, the waveguide coupler 200 includes a bottom clad layer 220, a waveguide core layer 230, and a top clad layer 240. The bottom clad layer 220 is disposed above an underlying structure (e.g., a reader). The waveguide core layer 230 is formed above the bottom clad layer 220. A first, top periodic grating structure 231 is formed at an interface between the top clad layer 240 and the waveguide core layer 230; and a second, bottom periodic grating structure 235 is formed at an interface between the bottom clad layer 220 and the waveguide core layer 230. The first, top grating 231 has a first period ($\Lambda_1$) 232 and a first etch depth (d1) 234; and the second, bottom grating 235 has a second period ($\Lambda_2$) 236 and a second etch depth (d2) 238. For confinement of the coupled laser beam 172 while travelling toward the NFT 158 (FIG. 1), the index of refraction of the material(s) comprising the top and bottom clad layers 240, 220 is lower than that of the material comprising the waveguide core layer 230. The material comprising the top and bottom clad layer can include any transparent or semi-transparent material including, but not limited to, $Al_2O_3$ and $SiO_2$. The material comprising the waveguide core layer can include any transparent or semi-transparent material including, but not limited to, $TiO_2$, $Ta_2O_5$, Si, SiN, and ZnS.

When a laser beam 171 is incident on the dual-grating waveguide coupler 200 at an incident angle θ (as measured from a surface normal 205) as shown in FIG. 2A, the momentum conservation between the incident laser beam 171 and a coupled laser beam 172 in the waveguide core layer 230, when satisfied through the diffraction of a grating, leads to a resonant energy transfer between the two laser beams, and the incident laser beam is coupled into the waveguide core layer 230. However, unlike in free space where photon propagation is isotropic, in the waveguide core layer 230, photons with different polarizations can possess different associated momentums. Therefore, a single-grating waveguide coupler can only have one set of momentum conservation conditions met, and can therefore maximally couple only one polarization component of the incident beam into the waveguide core layer 230. This can mean as high as 50% coupling loss if the state of polarization of the incident laser beam 171 is unknown or uncontrolled. A waveguide coupler having two gratings—one on the top (e.g., towards the laser source) and another on the bottom (e.g., away from the laser source)—such as the dual-grating waveguide coupler 200 shown in FIG. 2A can enjoy improved coupling efficiency, when each of the top and bottom grating structures are configured (e.g., optimized) for a particular component of the incident laser beam 171.

In general, the incident laser beam 171 can have two orthogonal polarizations, denoted a first polarization and a second polarization. For example, if an incoherent light source is used, the incoherence can be understood as the superposition of two orthogonal polarizations. Alternatively, if a coherent light source is used, the polarization of the light source may change during operation (e.g., as a side effect of heating in the light path, or the like), such that the laser beam 171 can be understood to have different orthogonal polarizations at different times. One of the first and second polarizations can be a transverse-electric (TE) polarization and the other of the first and second polarizations can be a transverse-magnetic (TM) polarization. Alternatively, one of the first and second polarizations can be a left circular polarization and the other of the first and second polarizations can be a right circular polarization. In one aspect of the subject technology, each of the first and the second gratings 231, 235 can be configured to couple one of the two orthogonal polarizations (e.g., TE and TM polarizations) into the waveguide core layer 230 in order to maximize the overall coupling efficiency of the dual-grating waveguide coupler 200. This can be achieved by selecting a combination of the period and the etch depth for a grating that yields a maximum coupling for a particular polarization of the incident laser beam 171 into the waveguide core layer 230. As indicated above, this occurs when the geometry of the grating is such that the diffraction by the grating provides a momentum conservation and, hence, resonant energy transfer, between particular polarization component of the incident laser beam 171 and the particular polarization component of the coupled laser beam 172. Eq. 1) provided below describes a relationship between such a resonant condition and the grating period $\Lambda$ and the incident angle $\theta$:

$$Neff = \sin\theta + m \cdot \frac{\lambda}{\Lambda}, \quad 1$$

where Neff is the effective refractive index of light in the waveguide core layer and is different for different polarization, m is the diffraction order, and $\lambda$ is the wavelength of the incident laser light.

Figure 2B:
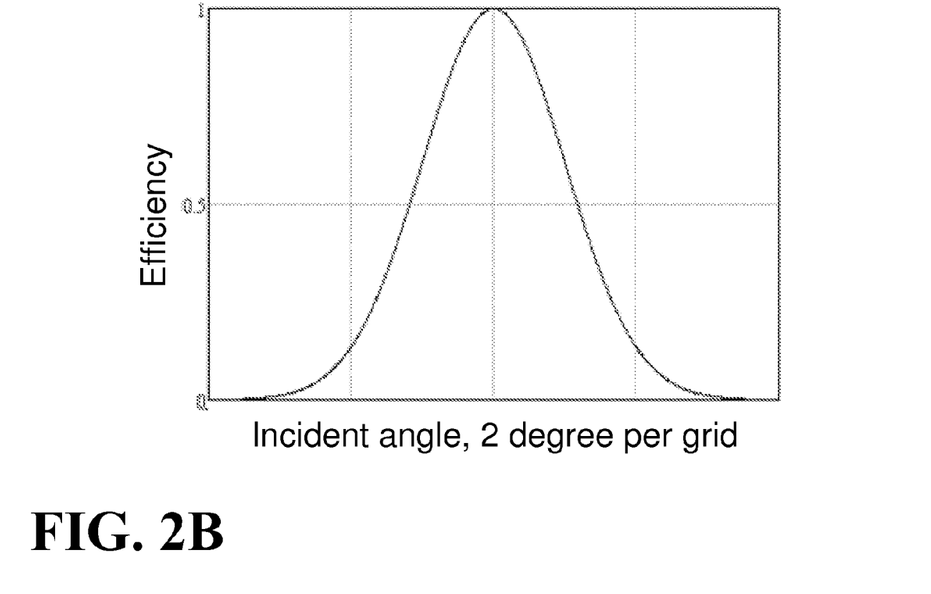
FIG. 2B shows a typical coupling efficiency response curve of a single grating waveguide coupler.
Figure 2C:
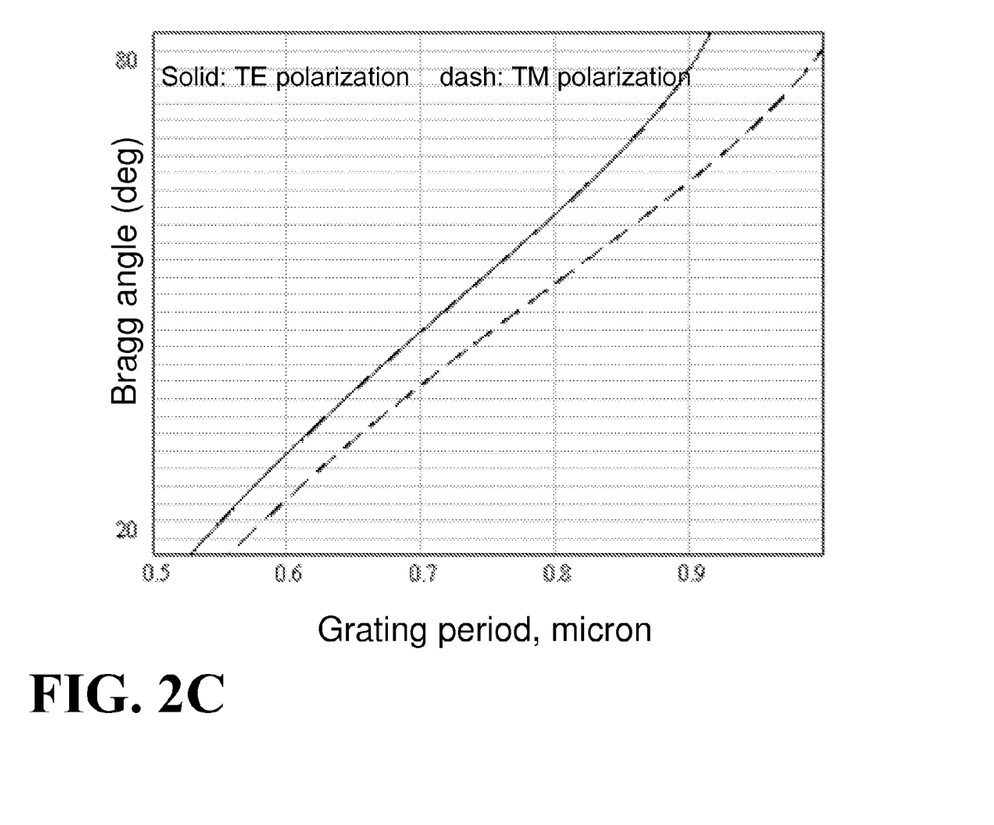
FIG. 2C shows a relationship between Bragg angle and grating period for a slab waveguide in accordance with one aspect of the subject technology.

In addition, a full width half maxima (FWHM) response angle of a typical efficiency response curve of a single grating is only a few degrees wide, as illustrated by exemplary FIG. 2B, in accordance with one aspect of the subject technology. Furthermore, for a single (period) grating, the maximum coupling angle, or Bragg angle, is different for different polarizations. The difference can be more than a few degrees. FIG. 2C shows a relationship between Bragg angle and grating period for a slab waveguide, in accordance with one aspect of the subject technology. Accordingly, as can be seen with reference to FIG. 2C, two polarizations cannot be maximally coupled into a waveguide coupler simultaneously.

Figure 2D:
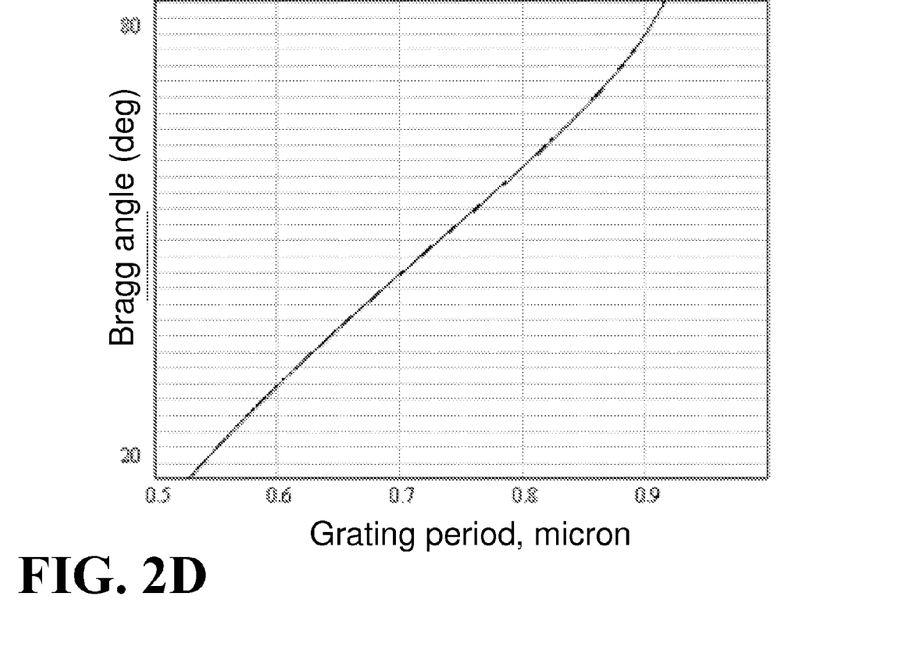
FIG. 2D shows a Bragg angle versus grating period curve for a dual grating structure according to one aspect of the subject technology.

However, in a dual grating design, by properly choosing the two periods, $\Lambda 1$ and $\Lambda 2$, and having them satisfy, in the first diffraction order (m=1):

$$\frac{Neff1 - Neff2}{\lambda} + \frac{1}{\Lambda 1} = \frac{1}{\Lambda 2}, \quad 2$$

one can unify the Bragg curve in FIG. 2C so that the dual grating can have a maximal coupling response regardless of the polarization of the incident beam, as illustrated in accordance with one aspect of the subject technology in FIG. 2D.

By providing two gratings 231, 235 which in combination satisfy Eq. 2, the dual grating waveguide coupler 200 can maximally couple two orthogonal polarizations simultaneously. Based on this approach, the dual-grating waveguide coupler 200 can have a significantly higher overall optical coupling efficiency as compared to a single-grating waveguide coupler. To this end, in certain embodiments of the waveguide coupler, the first period 232 associated with the first grating 231 is different from the second period 236 associated with the second grating 235. In other embodiments, the first etch depth 234 associated with the first grating 231 is different from the second etch depth 238 associated with the second grating 235. In some embodiments, the period and the etch depth are both different between the two gratings.

In some embodiments, in order to further increase the coupling efficiency, a reflective layer (not shown) is provided (e.g., coated) between the bottom clad layer and the substrate, the reflective layer configured to cause an uncoupled portion of the incident laser beam traveling toward the underlying structure to reflect back toward the waveguide core layer 230 where it can be given another chance to be coupled into the waveguide core layer 230 (by either first grating 231 or second grating 235, or both). The reflective layer can include any reflective material including, but is not limited to, gold (Au), silver (Ag), aluminum (Al), or any alloy thereof.

Figure 2E:
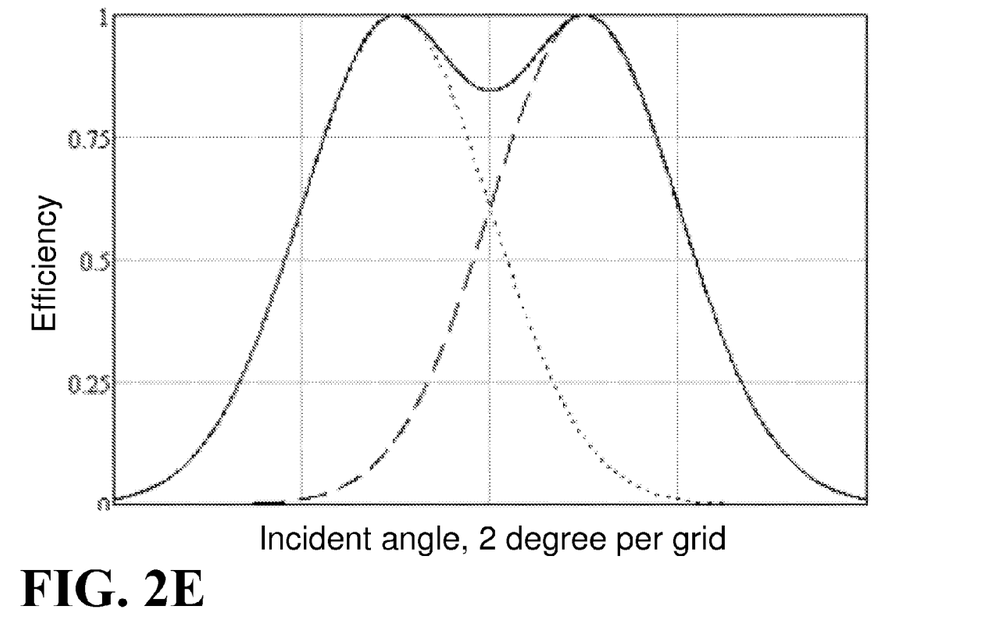
FIG. 2E shows a coupling efficiency response curve of a dual grating waveguide coupler according to one aspect of the subject technology.

While in the above description, waveguide coupler 200 is described as being configured to maximally couple two orthogonal polarizations of the incident laser beam 171 into the waveguide core layer 230, in other embodiments, the waveguide coupler 200 can be configured to maximally couple divergent incident laser beams. In this regard, the incident laser beams may be incident on the waveguide coupler 200 in a distribution of incident angles instead of a single incident angle. For example, the divergent incident laser beams can comprise a first portion and a second portion, where the first portion has a first incident angle with respect to the waveguide core layer, and the second portion of the incident EM radiation has a second incident angle with respect to the waveguide core layer. As discussed above with respect to Eq. 1 and FIG. 2B, the resonant condition is dependent on the incident angle $\theta$, and the FWHM response angle of a single grating is only a few degrees wide. Therefore, even for incident EM radiation having a single controlled polarization, a FWHM having a wide FWHM response angle may be desirable, especially for divergent incident EM radiation. For example, if the incident EM radiation includes two divergent laser beams, only one of the divergent beams can be maximally coupled by a single grating waveguide coupler. By providing two, top and bottom gratings with different geometries (e.g., periods and/or etch depths), a dual-grating waveguide coupler characterized by a response curve having a wider FWHM response angle such as the one illustrated in exemplary FIG. 2E may be obtained. Based on this approach, the dual-grating waveguide coupler 200 can be configured to couple a wider range of the distribution of incident angles and, hence, a greater portion of the incident laser beam into the waveguide core layer 230.

In other embodiments, the dual-grating waveguide coupler can be configured (e.g., optimized) for coupling both divergent laser beams and two orthogonally polarized laser beams. In yet other embodiments, the waveguide coupler can be configured to couple laser beam with astigmatism or having an elliptical shape. For example, the top and bottom gratings can have different curves and nonlinear pitches. In yet other embodiments, a metal trace or heat spreader can be put on top of the overcoat layer 310 to reduce the thermal concerns to yield a high laser performance, especially those involving flip-chip bonding of VCSEL.

Figure 3A:
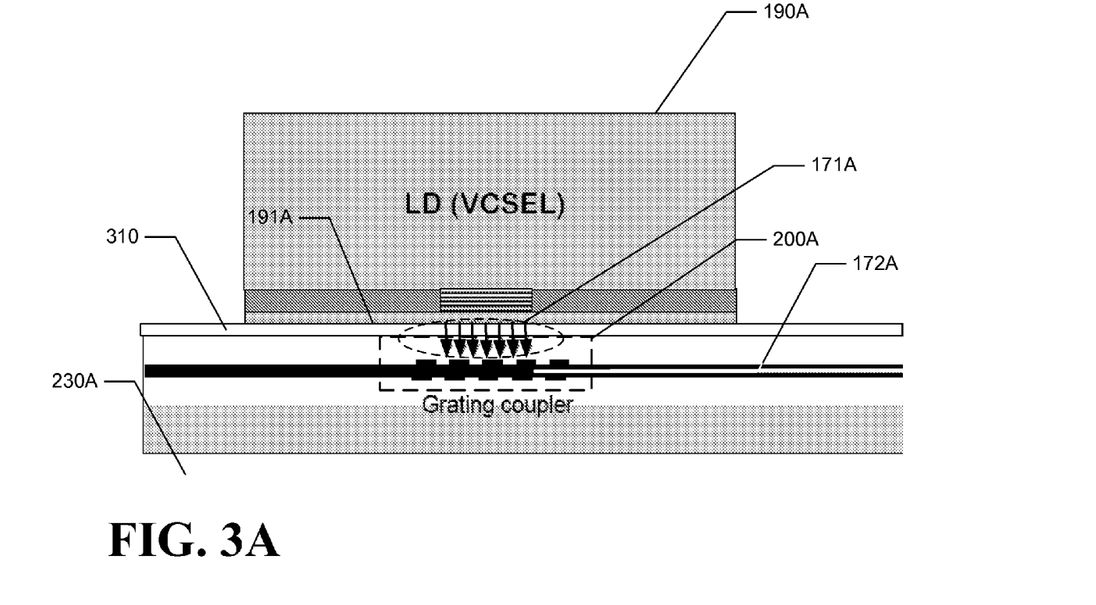
FIG. 3A is a diagram illustrating a laser diode affixed to or integrated on a surface of the slider proximal to the waveguide coupler according to one aspect of the subject technology.

As indicated above, the source of the incident laser beam 171 can be a semiconductor laser diode such as the laser diode 190 shown in FIG. 1. However, there can be different arrangements for the position of the laser diode. FIG. 3A is a diagram illustrating a laser diode 190A affixed (e.g., bonded, epoxied, or welded) to or otherwise in contact with the surface of the slider 101 (from FIG. 1) proximal to the waveguide coupler 200A via an overcoat layer 310. In the illustrated example, the laser diode 190A is a vertical-cavity surface emitting laser (VCSEL) having an emitting surface 191A bonded to a top surface of the overcoat layer 310. In other embodiments, the laser diode 190A can be an edge emitting laser. In some embodiments, the laser diode 191A can be a bare die diode laser. In other embodiments, the laser diode 190A can be a packaged laser (e.g., in TO-can). In certain embodiments, the laser diode 190A can be affixed to or otherwise in contact with the slider directly without an overcoat layer 310 disposed in between.

During the recording operation, the VCSEL 190A emits incident laser beam 171A substantially perpendicular to the emitting surface 191A. The incident laser beam 171A is coupled into the waveguide core layer 230A by the top and bottom gratings of the waveguide coupler 200A to form a coupled laser beam 172A. The coupled laser beam 172A is directed and supplied to the near field transducer 158 (of FIG. 1).

Figure 3B:
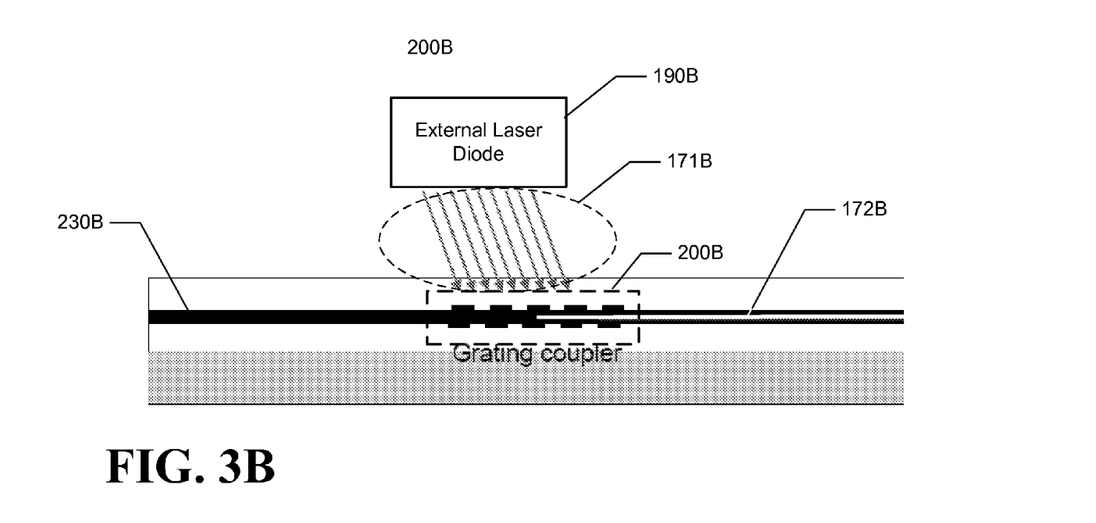
FIG. 3B is a diagram illustrating an external laser diode disposed separate from the slider and configured to transmit incident laser beam to the waveguide coupler via an air gap according to one aspect of the subject technology.

FIG. 3B is a diagram illustrating an external laser diode 190B disposed separate from the slider and configured to emit incident laser beam 171B toward the waveguide coupler portion 200B via an air gap. In certain embodiments, the incident laser beam 171B can be collimated via a focusing lens (not shown).

In some embodiments (not shown) employing an external laser diode, the incident laser beam can be delivered to the waveguide coupler portion via an optical fiber having a first end affixed to or otherwise in contact with the laser diode and a second end affixed or otherwise in contact with the surface of the slider proximal to the waveguide coupler with or without an overcoat layer.

During a recording operation, the external laser diode 190 emits the incident laser beam 171B towards the waveguide coupler 200B. The incident laser beam 171B is coupled into the waveguide core layer 230B by the top and bottom gratings of the waveguide coupler 200B to form a coupled laser beam 172B. The coupled laser beam 172B is directed and supplied to the near field transducer 158 (of FIG. 1).

Figure 4:
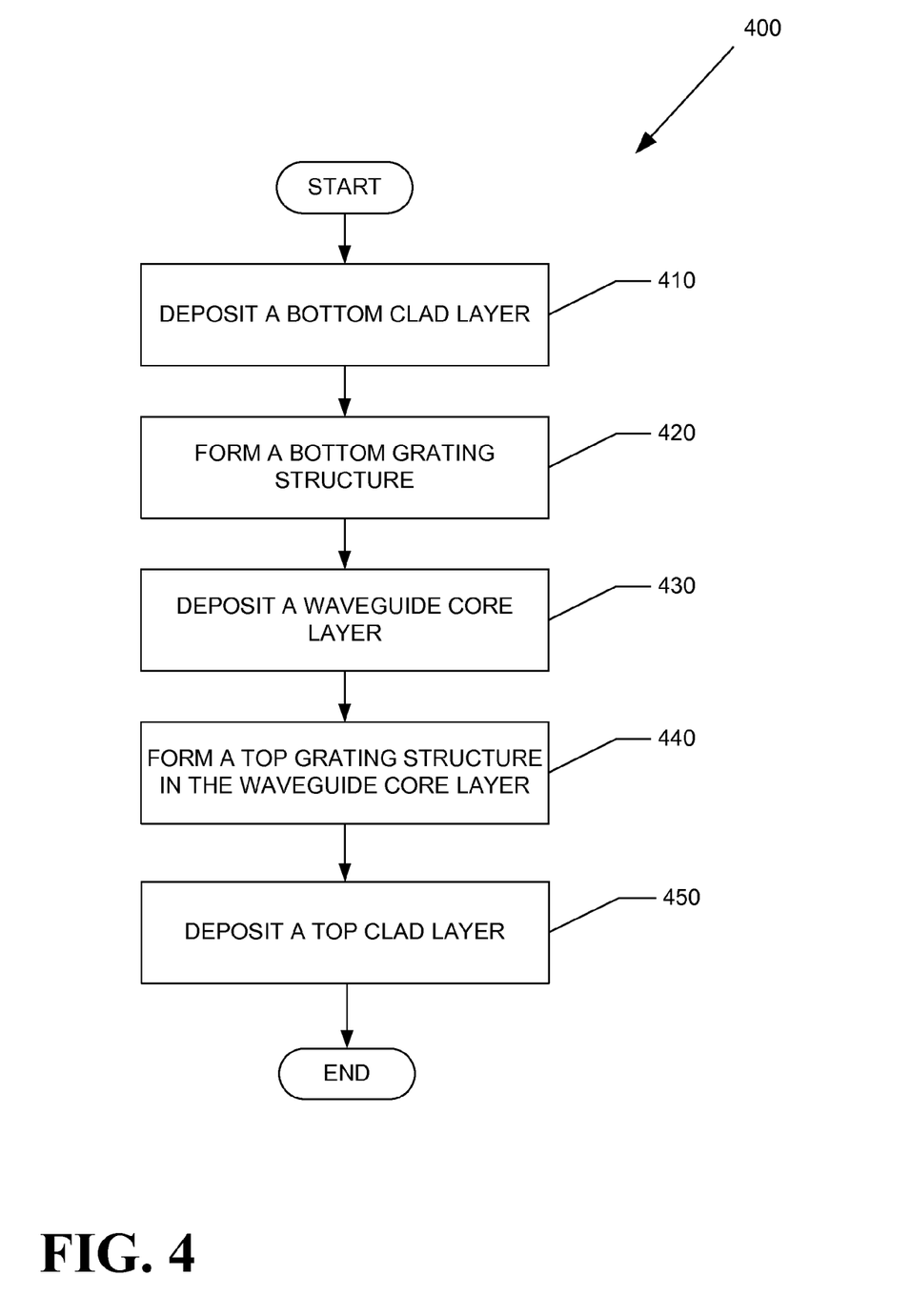
FIG. 4 is a flowchart illustrating an exemplary process for forming a waveguide coupler structure according to one aspect of the subject technology.

FIG. 4 is a flowchart illustrating an exemplary process 400 for forming a dual-grating waveguide coupler structure. For the purpose of illustration only, the process 400 is described with reference to the waveguide coupler 200 of FIG. 2A. The process 400 begins at a state 410, in which the bottom clad layer 220 is deposited over an underlying structure (e.g., a reader). The bottom clad layer 220 can include any transparent or semi-transparent material including, but not limited to, $Al_2O_3$ and $SiO_2$. In some embodiments, a reflective metallic layer can be deposited between the underlying structure and the bottom clad layer 220 to further increase the coupling efficiency as discussed above.

The process 400 proceeds to a state 420, in which the bottom grating 235 having the second period 236 and the second etch depth 238 is formed in the bottom clad layer 220. In one aspect of the subject technology, this can be achieved via a photolithographic process. The photolithographic process for forming a grating structure is well known in the art, and is not repeated here. It is worth noting that the second period 236 associated with the bottom grating 235 is primarily determined by the photomask pattern; and the second etch depth 238 associated with the bottom grating 235 may be primarily determined by the etching time, etching power, or the like.

The process 400 proceeds to a state 430, in which a waveguide core layer 230 is deposited on the bottom clad layer 220 having the bottom grating 235 formed therein. The waveguide core layer 230 can include any transparent or semi-transparent material including, but not limited to, $TiO_2$, $Ta_2O_5$, Si, SiN, and ZnS. The process 400 proceeds to a state 440, in which the top grating 231 having the first period 232 and the first etch depth 234 is formed in the waveguide core layer 230. This can be achieved via a photolithographic process similar to the one used for forming the bottom grating 235. The process 400 proceeds to a state 450, in which the top clad layer 240 is deposited above the waveguide core layer 230. The top clad layer 240 can include any transparent or semi-transparent material including, but is not limited to, $Al_2O_3$ and $SiO_2$. As indicated above, for confinement of the coupled laser beam 172 in the waveguide core layer 230 the index of refraction of the material(s) comprising the top and bottom clad layers 240, 220 is lower than that of the material comprising the waveguide core layer 230.

It shall be appreciated by those skilled in the art in view of the present disclosure that the particular process for forming a dual-grating waveguide coupler structure described above is one example of many different ways of forming a dual-grating waveguide coupler structure. For example, in some alternative processes, the bottom grating structure can be formed in the core layer rather than the bottom clad layer. This can be achieved, for example, by: 1) depositing a partial thin layer of a core material over a flat bottom clad layer (without a grating formed therein); 2) forming periodic trenches in the thin core layer; and 3) filling the trenches with a clad material (which may or may not be the same as the material as the bottom clad layer). Subsequently, another layer of the core material can be deposited over the bottom grating structure thus formed to form the rest of the waveguide core layer.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. An energy-assisted magnetic recording head comprising:
   a dual-grating waveguide coupler for coupling incident electromagnetic (EM) radiation into a waveguide, the waveguide coupler comprising:
   a bottom clad layer;
   a waveguide core layer formed above the bottom clad layer, wherein an interface between the bottom clad layer and the waveguide core layer comprises a first grating having a first period and a first etch depth, the first period and the first etch depth being configured to couple a first portion of the incident EM radiation into the waveguide core layer;
   a top clad layer formed above the waveguide core layer, wherein an interface between the waveguide core layer and the top clad layer comprises a second grating having a second period and a second etch depth, the second period and the second etch depth being configured to couple a second portion of the incident EM radiation into the waveguide core layer; and
   a near field transducer (NFT) disposed at a distal end of the waveguide coupler and configured to receive a coupled EM radiation from the distal end the waveguide coupler, the coupled EM radiation comprising the first coupled portion and the second coupled portion of the incident EM radiation, and to concentrate the coupled EM radiation onto a spot on a magnetic recording medium,
   wherein the first portion of the incident EM radiation has a first polarization, and wherein the second portion of the incident EM radiation has a second polarization, and
   further wherein one of the first and second polarizations is a transverse-electric (TE) polarization or a left circular polarization, and the other of the first and second polarizations is a transverse-magnetic (TM) polarization or a right circular polarization, respectively.

2. The magnetic head of claim 1, wherein the first period differs from the second period.

3. The magnetic head of claim 1, wherein the first etch depth differs from the second etch depth.

4. The magnetic head of claim 1, wherein the first portion of the incident EM radiation has a first polarization, and wherein the second portion of the incident EM radiation has a second polarization.

5. The magnetic head of claim 4, wherein the first polarization and the second polarization are orthogonal polarizations.

6. The magnetic head of claim 1, wherein a refractive index of the waveguide core layer is higher than a refractive index of either the top clad layer or the bottom clad layer.

7. The magnetic head of claim 1, wherein the magnetic head further comprises:
   a substrate disposed below the bottom clad layer, and
   a reflective layer disposed between the bottom clad layer and the substrate, the reflective layer configured to cause an uncoupled portion of the incident EM radiation traveling toward the substrate to reflect back toward the waveguide core layer.

8. The magnetic head of claim 1, wherein the incident EM radiation is generated by a semiconductor laser.

9. The magnetic head of claim 8, wherein the semiconductor laser diode comprises a vertical-cavity surface-emitting laser (VCSEL).

10. The magnetic head of claim 8, wherein the incident EM radiation generated by the semiconductor laser is divergent, and wherein the first portion of the incident EM radiation has a first incident angle with respect to the waveguide core layer, and wherein the second portion of the incident EM radiation has a second incident angle with respect to the waveguide core layer.

11. The magnetic head of claim 1, wherein the incident EM radiation is collimated.

12. The magnetic head of claim 1, wherein the bottom clad layer and the top clad layer comprise a same material.

13. The magnetic head of claim 12, wherein the same material is selected from the group consisting of $Al_2O_3$ and $SiO_2$.

14. The magnetic head of claim 1, wherein the waveguide core layer comprises a material selected from a group consisting of $TiO_2$, $Ta_2O_5$, Si, SiN, and ZnS.

15. A method of making a magnetic head comprising a waveguide coupler for coupling incident electromagnetic (EM) radiation, the method comprising:
   providing a substrate;
   depositing a bottom clad layer over the substrate;
   forming a first grating structure in the bottom clad layer, the first grating structure comprising a first period and a first etch depth, the first period and the first etch depth configured to couple a first portion of the incident EM radiation into a waveguide core layer;
   depositing the waveguide core layer over the bottom clad layer;
   forming a second grating structure in the waveguide core layer, the second grating structure comprising a second period and a second etch depth, the second period and the second etch depth configured to couple a second portion of the incident EM radiation into the waveguide core layer;
   depositing a top clad layer above the waveguide core layer; and
   disposing a reflective layer between the bottom clad layer and the substrate, the reflective layer configured to cause an uncoupled portion of the incident EM radiation traveling toward the substrate to reflect back toward the waveguide core layer,
   wherein the first portion of the incident EM radiation has a first polarization, and wherein the second portion of the incident EM radiation has a second polarization, and
   further wherein one of the first and second polarizations is a transverse-electric (TE) polarization or a left circular polarization, and the other of the first and second polarizations is a transverse-magnetic (TM) or a right circular polarization, respectively.

16. The method of claim 15, wherein the first period differs from the second period.

17. The method of claim 15, wherein the first etch depth differs from the second etch depth.

18. The method of claim 15, wherein the first portion of the incident EM radiation has a first polarization, and wherein the second portion of the incident EM radiation has a second polarization.

19. The method of claim 18, wherein the first polarization and the second polarization are orthogonal polarizations.

20. The method of claim 18, wherein a refractive index of the waveguide core layer is higher than a refractive index of either the top clad layer or the bottom clad layer.

21. The method of claim 15, wherein the incident EM radiation is divergent, and wherein the first portion of the incident EM radiation has a first incident angle with respect to the waveguide core layer, and wherein the second portion of the incident EM radiation has a second incident angle with respect to the waveguide core layer.

22. The method of claim 15, wherein the bottom clad layer and the top clad layer comprise a same material.

23. The method of claim 22, wherein the same material is selected from the group consisting of $Al_2O_3$ and $SiO_2$.

24. The method of claim 15, wherein the waveguide core layer comprises a material selected from a group consisting of $TiO_2$, $Ta_2O_5$, Si, SiN, and ZnS.

* * * * *